Feb. 7, 1967  H. LUCIUS  3,303,422
SIGNAL VOLTAGE PEAK AND FREQUENCY MEASURING APPARATUS
USING HETERODYNE PRINCIPLE
Filed March 23, 1962  3 Sheets-Sheet 1
Fig. 3
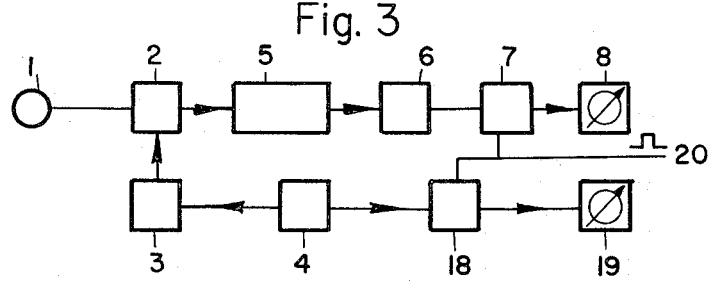
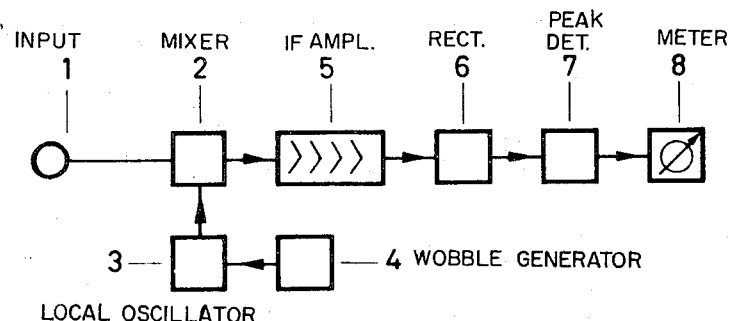
Fig. 1
Fig. 2
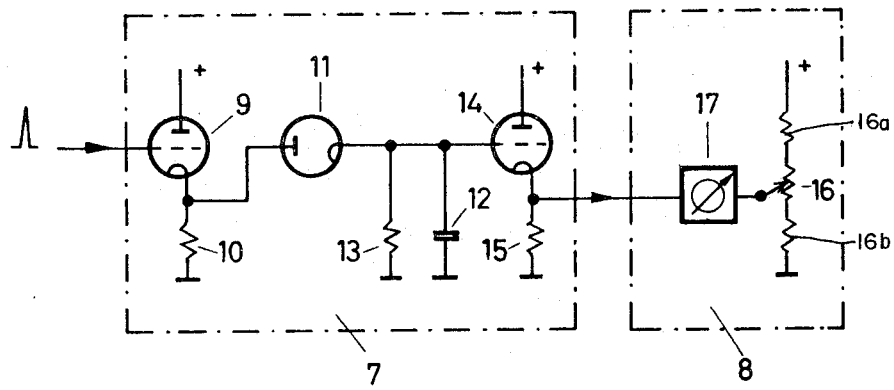
INVENTOR.
HORST LUCIUS
BY
ATTORNEY

INVENTOR.
HORST LUCIUS
BY
ATTORNEY 3,303,422
SIGNAL VOLTAGE PEAK AND FREQUENCY
MEASURING APPARATUS USING HETERO-
DYNE PRINCIPLE
Horst Lucius, Hohenschaftlarn, Germany, assignor to
Rohde & Schwarz Offene Handelsgesellschaft, Munich,
Germany
Filed Mar. 23, 1962, Ser. No. 182,038
Claims priority, application Germany, Mar. 27, 1961,
R 29,980; May 5, 1961, R 30,271
2 Claims. (Cl. 324—103)

The invention relates to a volt meter for electrical signals, particularly of low intensity and such as could occur at small frequency spacings, as discrete signal voltages within a wide high frequency range.

It is known to measure high frequency voltages in the field of communications by means of a vacuum tube volt meter. This represents to a certain extent the standard instrument permitting to determine with sufficient accuracy, high frequency voltages even of a small magnitude, i.e., down to several millivolts. It is also necessary to measure still smaller voltages such as voltages forming received signals, or disturbance oscillations in television receivers.

Such smaller voltages of the order of a few microvolts cannot readily be measured by vacuum tube volt meters. This range of measurements, required the use of so called panoramic receiver in which the voltage amplitudes are reproduced on the screen of a cathode ray tube within a large range of frequencies.

With vacuum tube volt meters in addition to being less sensitive, it is not possible to accurately determine amplitude valves of discrete signals when a number of signals exist in the frequency band being measured, having little distinguishable amplitude values. The result indicated may be falsified by adjacent signals. Thus it has been found to be more advantageous to use the rather expensive measuring receivers because the receiver band width, being determined by the transmission range of an intermediate frequency amplifier, provides sufficient separation to permit even closely adjacent signals to be measured without difficulty. This large separation power, however, makes operation of such an instrument difficult; the signals to be measured have to be searched over the frequency measuring range of the receiver which requires extraordinarily slow tuning. At the same time there is no assurance that a very weak signal will not remain disregarded. This danger of "over measuring" of weak signals does not exist if so called panoramic receivers are employed. Such panoramic receivers, however, are still more expensive than the measuring receivers, because in view of the expected accuracy they must not only be equipped with a large observation screen but also must be designed to reject image frequencies.

Panoramic instruments, therefore, have been used in measurements only whenever indispensable. No equivalent inexpensive instrument existed that could be readily operated not only for the range of very small voltages but also for the measuring of large voltages.

It is an object of the invention to provide an instrument selectively indicating the signal of largest voltage amplitude within a band, or spectrum, of electrical signal voltages.

The voltages of all the signals of the range within the spectrum are heterodyned with a signal of varying frequency, for example obtained from a local oscillator controlled by a wobble generator. After (preferably) multiple amplification, for example, by means of a cathode follower amplifier, the heterodyned, now intermediate frequency signal, is applied to a diode, and then to an R–C network having a high resistance resistor whereby the signal of highest voltage amplitude is indicated as peak voltage.

Such a volt meter has the advantage, as compared to an instrument equipped with a cathode ray tube, that it is inexpensive; at the same time it provides a device which can be used anywhere in the above mentioned fields of application.

The wobble generator as well as the output of the receiving rectifier may be connected to a timed gate to indicate the frequency position of the largest voltage amplitude of the selected impulse. A volt meter thus equipped in accordance with the invention, permits determination by separate measuring devices not only of the magnitude of the highest voltage amplitude signal existing at any time in the frequency band concerned, but also of its frequency position.

Particularly high stability of the indicating devices may be achieved, in accordance with another feature of the invention, by arranging these measuring devices between the cathodes of a twin-triode.

Panoramic receivers may become overloaded; this prevents accurate measurements of strong and weak signals next to each other, nor do they permit the measuring of strong and weak signals simultaneously except with the use of a logarithmic scale which impairs the accuracy of amplitude measurements.

The apparatus of the invention provides a relatively inexpensive instrument which is readily operable, and which permits the rapid finding within a predetermined measuring range, of signals of any desired amplitude and within a widely varying frequency band, or spectrum, and at the same time enables the measurement of these signals with the highest accuracy even when there are disposed next to the signal to be measured, other signals of only slightly different amplitudes.

In contrast to known measuring methods the invention provides a new universal method in the sense that within the measuring range under consideration not only the signal of largest amplitude but also a series of other signals varying from the largest to smallest amplitudes are separately measured.

Selective indication of voltage amplitude and frequency of individual signal can be obtained by rapidly applying to the R–C network, the voltage of each signal within the band, and separating by individual sequals an opening or closing pulse of variable pulse width, derived from an adjustable timing source.

The opening or closing pulse may operate on either the local oscillator or the intermediate frequency amplifier, or if a triode is used instead of the switching diode, it may be applied to the grid of the triode. A volt meter of this type combined with a simple control of position and width of the "separating" pulse, provides rapid indication or registration of amplitude and frequency of each individual signal.

Several timing sources may be used, connected to the input of the wobble generator.

Control of the separate pulses from these sources can be achieved by adjusting them automatically or by means of a saw tooth generator, connected through an electronic switch.

A cathode ray tube may be used to supervise the individual signals to be measured within the measuring range concerned, connected in parallel to the peak detector.

These and further features of the invention will be more fully apparent from the drawings annexed herein in which: FIG. 1 represents, in block diagram, an embodiment of the invention.

FIG. 2 illustrates schematically the internal structure of the two block diagrams at the output of the arrangement of FIG. 1.

FIG. 3 shows, in block form, another embodiment of the circuit of FIG. 1.

Figure 4:
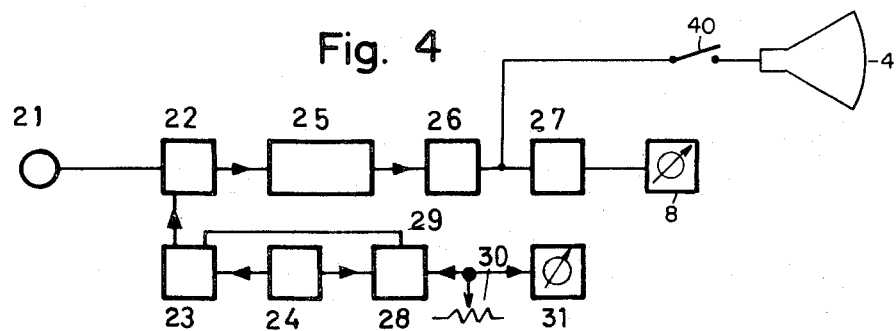
FIG. 4 illustrates an embodiment of the invention wherein the control pulse derived from the time comparator is applied to the turnable oscillator.

Referring to FIG. 1: signals within the spectrum of signal voltages and consisting of a mixture of several signals of different voltage amplitudes and frequency positions, are applied over input 1 to a mixer, or converter stage 2, in which the above mentioned signal mixture is converted by the frequencies of oscillator 3, the frequency of oscillator 2 is shifted by wobble generator 4. The product derived from mixing stage 2 is applied through intermediate frequency amplifier 5 to a rectifier 6, and from there to a peak detector 7, to which an indicating device 8 is connected to display the magnitude of the largest voltage amplitude.

The structure of peak detector 7 and indicating device 8 appears from FIG. 2.

The voltage emerging from receiving rectifier 6 is applied, first, to the grid of triode 9 operating as a cathode follower amplifier and having a very low output resistance. This output resistance consists of the internal resistance of tube 9 and cathode resistance 10. The signal voltages charge, very rapidly, condenser 12 connected through switching diode 11. The discharge of condenser 12, however, occurs only very slowly through a high value resistor 13. The voltage prevailing at any time on condenser 12 is applied to the grid of cathode follower 14. The signal of highest voltage amplitude will be picked off as the peak voltage from cathode resistance 15, and will be indicated on device 17. Indicator 16 is connected across a bridge circuit having an adjustable resistance 16, and otherwise including the internal resistance of tube 14, cathode resistor 15, and resistances 16a, 16b. In FIG. 3 timed gate 18 and inductor 19 are added to the circuit. Signal impulses are applied to peak detector 7, and to gate 18 over line 20 to synchronously activate instrument 19 and indicator 8. The instantaneous value of the voltage derived from wobble generator 4, which is a representation of the corresponding frequency position of the signal will be indicated on instrument 19. The measuring devices 8 and 19, instead of being arranged in the above mentioned bridge circuit (FIG. 2), may also be disposed between the cathodes of a twin-triode, thus providing for high stability.

In order to avoid feedback of the voltage of oscillator 3 through mixer 2 to input 1, it is preferred to provide in front of mixer 2 a broad band input stage, and to select the frequency position of oscillator 3 in such a manner that the resulting intermediate frequency is high compared to the input frequency to be measured. In this manner, through the input separation stage, feed back to input 1, is avoided.

According to FIG. 4 the signal mixture consisting usually of several signals of different voltage amplitudes and frequency positions, are applied through input 21 to a mixer stage 22 where the above mentioned mixture is converted together with the frequencies of the heterodyning oscillator 23. Oscillator 23 in turn is periodically tuned in its frequency by wobble generator 24. The resulting product is fed through intermediate frequency amplifier 25 to receiving rectifier 26 through which it actuates upon peak detector 27. Peak detector 27 causes the indicating device 8, connected thereto, to indicate the magnitude of the voltage amplitude. The heterodyning oscillator is gated ON by a timing unit 28, connected through line 29. The timing cycle, or frequency of unit 28, may be adjusted by potentiometer 30; a representation of the frequency is readable on device 31. Thus the frequency position of the indicated value on meter 8 may be controlled.

The structure of peak detector 27 is similar to that shown in FIG. 2.

A cathode ray tube 41 can be connected parallel to peak detector 27 through switch 40. In this way it is possible to obtain the above mentioned supervision over all signals existing within the measuring range concerned.

The pulses applied from timing generator 28 through line 29 to heterodyning oscillator 23, may cause the oscillator 23 to affect converter 22 in a time range, adjustable by potentiometer 30. Alternatively, they may transfer a closing pulse of adjustable frequency position to oscillator 23, to suppress a predetermined frequency range within the frequency band applied to converter 22. Depending upon the pulse type selected, i.e. the use of opening or closing pulses by means of a corresponding adjustment of potentiometer 30, the volt meter 8 (FIG. 4) measures the peak of a signal determined by the frequency position of the opening pulse, within a range determined by partial suppression of the spectrum by a closing pulse. Generally, signal suppression is only used in case the measuring range contains, in addition to a strong signal of constant frequency position, much weaker signals of varying frequency positions which require, for accurate determination, that the strong and otherwise disturbing signal be suppressed. The adjustment of potentiometer 30 permits production of opening and closing pulses of different frequency positions. The width of these pulses can also be made adjustable, for example, by means of a variable potentiometer. A broad opening pulse serves principally for positioning purposes while the reduction of its width and therefore the reduction of its blanking effect, may be used for the measurement of a signal which has already been positioned. The closing pulse works in opposite directions.

Figure 5:
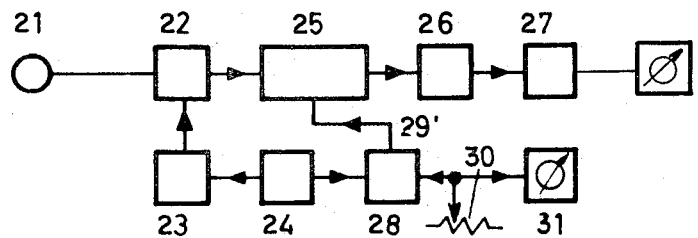
FIG. 5 represents an embodiment in which the control pulse of the time comparator controls the intermediate frequency amplifier.

Referring to FIG. 5, the structure of the volt meter is substantially the same as has been described by way of FIG. 4. Here, however, line 29' extends between timing source 28 and intermediate frequency amplifier 25. Opening and closing pulses, again adjustable on potentiometer 30 in frequency position and frequency width, are active on intermediate frequency amplifier 25 in the same manner as in FIG. 4 with respect to oscillator 23.

Figure 6:
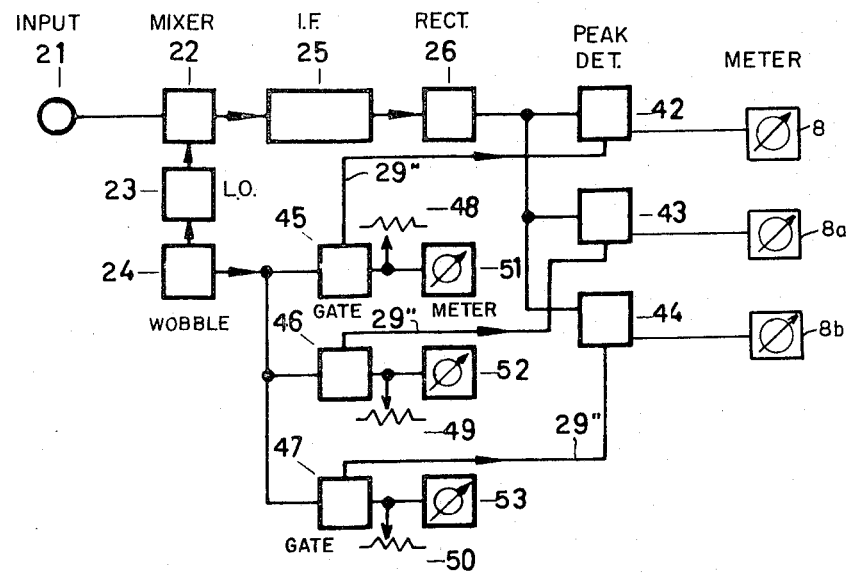
FIG. 6 shows an example of the invention in which the amplitude and frequency values of several signals within the measuring range are reproduced simultaneously.

FIG. 6 illustrates an example of an embodiment of the invention in which a plurality of control lines 29" are provided to open and close pulses. These pulses instead of being applied as in FIG. 4 to oscillator 23, or as in FIG. 6 to intermediate frequency amplifier 25, are applied to the grid of a triode, replacing diode 11 of FIG. 2, in peak detectors 42, 43, 44 under control of timing generators 45, 46, 47. The control of these pulses is derived from potentiometers 48, 49, 50 and their frequency position is reproduced on instruments 51, 52, 53. These instruments as well as the instruments shown in the other examples of the invention may either be constructed as indicating devices or as registering apparatus. Otherwise the structure of the arrangement according to FIG. 6 is substantially the same as that of the arrangement according to FIG. 4, and both are similarly designated. Each of peak detectors 42, 43, 44 is connected to an instrument 8, 8', 8", respectively.

It has already been noted that as a result of the provision of three measuring lines 29", FIG. 6 permits three signals to be determined simultaneously in their amplitude and frequency positions. This multiplicity of measuring, of course, may be increased or decreased.

Figure 7:
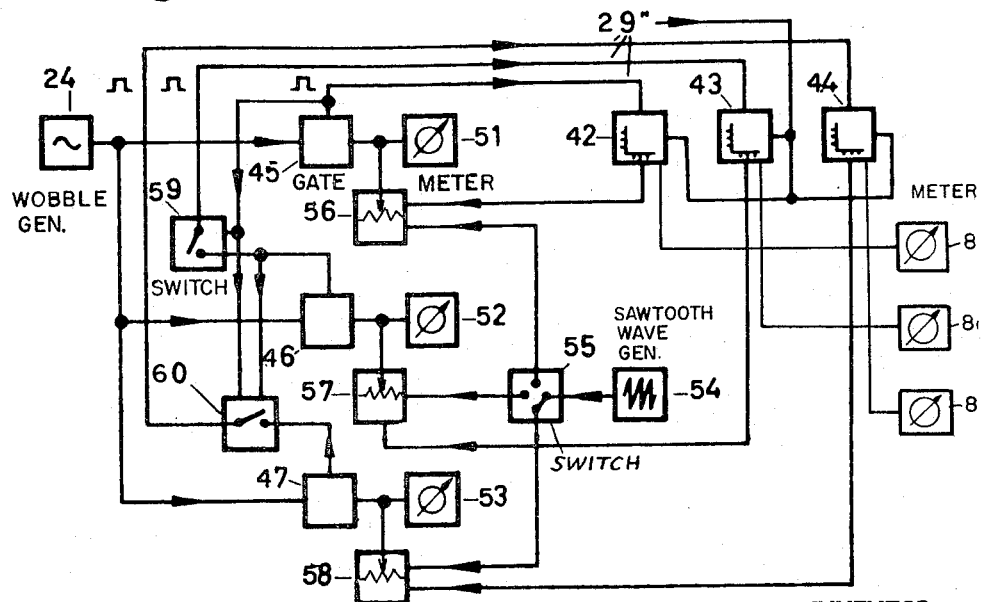
FIG. 7 shows again an arrangement in which the adjustment of the time comparator is effected automatically.

As shown in FIG. 7, timing generators 45 to 47 of FIG. 7 and their instruments 51 to 53, are actuated from saw tooth generator 54, through electronic switch 55 and controllable electronic potentiometers 56, 57, 58. These electronic potentiometers consist of a twin-triode controlled on the one side by saw tooth generator 54 in accordance with electronic switch 55, and on the other side by the amplitude values indicated on peak detectors 42 to 44.

A comparison of such electronic potentiometer with one of usual construction, shows that in the electronic potentiometer the drive is initiated, under control of saw tooth generator 54. This drive is interrupted by the values of detectors 42 to 44 at the corresponding "Taps" of the electronic potentiometer.

Electric switches 59 and 60 prevent one and the same signal from arriving at peak detectors 42 to 44 by their interposition in the lines for timing generators 45, 46, 47. Thus at any time only one of the control lines 29" produces a pulse determining a frequency position and preventing several control lines from carrying, simultaneously, pulses of the same frequency position.

I claim:

1. Apparatus for determining the peak signal within a spectrum of electrical signal voltages occurring as discrete signals, in a wide high-frequency band, comprising means scanning the frequency band to produce voltages occurring in timed sequence one after another at its output, said scanning means including a local oscillator; a wobble generator connected to said local oscillator and producing output voltages of a frequency varying in time; a mixer circuit having said spectrum of electrical signal voltages applied thereto and further connected to said scanning means to heterodyne said signal voltages and the frequency-varying local oscillator voltages to obtain derived signals varying in time; a peak detector having the derived signal voltages obtained from said mixer circuit applied thereto; indicator means to indicate peak voltage values detected by said peak detector; means indicating the frequency within said spectrum being scanned by said scanning means; and means selectively and simultaneously actuating said frequency indicating means and said indicator means to indicate the peak signal value and its frequency position within said spectrum.

2. Apparatus in accordance with claim 1 including a plurality of peak detectors, in parallel, and connected to have said signal voltages applied thereto; a plurality of gating means connected to selectively enable the peak detectors, and said frequency indicating means, in synchronism; and means controlling the time of operation of said gating means.

References Cited by the Examiner

UNITED STATES PATENTS

| 2,522,369 | 9/1950 | Guanella | 324—77 |
| 2,790,897 | 4/1957 | Herman | 250—39 |
| 2,997,651 | 8/1961 | Richeson et al. | 324—103 |

WALTER L. CARLSON, *Primary Examiner.*

FREDERICK M. STRADER, *Examiner.*

D. R. GREENE, J. J. MULROONEY,
*Assistant Examiners.*